US008473429B2

(12) United States Patent
Cheng et al.

(10) Patent No.: US 8,473,429 B2
(45) Date of Patent: Jun. 25, 2013

(54) MANAGING PERSONAL DIGITAL ASSETS OVER MULTIPLE DEVICES

(75) Inventors: Doreen Cheng, San Jose, CA (US); Yu Song, Pleasanton, CA (US); Swaroop S. Kalasapur, Santa Clara, CA (US); Victoria Stavridou-Coleman, Menlo Park, CA (US); Jean-Pierre Seifert, Tirol, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 673 days.

(21) Appl. No.: 12/498,996

(22) Filed: Jul. 7, 2009

(65) Prior Publication Data

US 2010/0010944 A1    Jan. 14, 2010

Related U.S. Application Data

(60) Provisional application No. 61/079,651, filed on Jul. 10, 2008.

(51) Int. Cl.
G06F 15/18    (2006.01)

(52) U.S. Cl.
USPC .......................................................... 706/12

(58) Field of Classification Search
None
See application file for complete search history.

(56) References Cited

U.S. PATENT DOCUMENTS 5,845,282 A * 12/1998 Alley et al. ........................... 1/1
6,192,340 B1 * 2/2001 Abecassis ...................... 704/270
6,931,407 B1    8/2005 Brown
7,853,669 B2 * 12/2010 Moromisato et al. ......... 709/217
2002/0082997 A1    6/2002 Kobata et al.
2005/0028104 A1    2/2005 Apparao et al.
2006/0123081 A1 * 6/2006 Baudino et al. ............... 709/204
2006/0184538 A1    8/2006 Randall et al.
2007/0113288 A1    5/2007 Blumenau
2009/0077055 A1 * 3/2009 Dillon et al. ...................... 707/5

OTHER PUBLICATIONS

Maes et al., "Learning Interface Agents", 1993, AAAI, pp. 459-465.*
Lei et al., "Applying Situation Awareness to Mobile Proactive Information Delivery", 2007, Lecture Notes in Computer Science, vol. 4809, pp. 592-603.*
Miller et al., "Home Networking with Universal Plug and Play", Dec. 2001, IEEE Communication Magazine, pp. 104-109.*
Rob Berry, "Aggregate Services Across Multiple Cloud Domains", Nov. 6, 2009, website: "http://itknowledgeexchange.techtarget.com/soa-talk/aggregate-services-across-multiple-cloud-domains/".*
Supplementary European Search Report in corresponding European Application No. 09794655, dated Oct. 11, 2011.

(Continued)

Primary Examiner — Alan Chen
Assistant Examiner — Paulinho E Smith
(74) Attorney, Agent, or Firm — Kenneth L. Sherman, Esq.; Michael Zarrabian, Esq.; Sherman & Zarrabian LLP

(57) ABSTRACT

In a first embodiment of the present invention, a method for managing digital assets of a user over multiple home network-enabled devices is provided. In this method, information is received from a plurality of home network-enabled personal devices within a user's personal cloud. The information includes usage information regarding the user's use of digital assets on those home network-enabled personal devices. Later, digital assets from the personal cloud, including assets located on non-personal devices outside a user's control (but still in the personal cloud) can be accessed using the gathered usage information.

27 Claims, 9 Drawing Sheets

OTHER PUBLICATIONS

International Search Report in corresponding International Application No. PCT/KR 2009/003768, mailed Feb. 9, 2011.
Written Opinion in corresponding International Application No. PCT/KR 2009/003768, mailed Feb. 9, 2011.
"Push Email, Push Contacts, Push Calendar," http://www.apple.com/mobileme.
"Live Mesh," http://blogs.msdn.com/livemesh, Jun. 25, 2009, 12pgs. Your Friends, files and digital life on any computer, http://www.icloud.com/.
"YouOS," Wikipedia, http://en.wikipedia.org/wiki/Youos, 3pgs.
"Virtual Desktops for Businesses and Personal Use," http://mokafive.com.
"Virtual Appliances in the Collective: A Road to Hassle-Free Computing," Sapuntzakis et al., Computer Systems Laboratory Stanford University, http://suif.standford.edu/collective/hotos03-virtual-app.pdf, Jun. 27, 2003, 6pgs.
"Optimizing the Migration of Virtual Computers," Sapuntzakis et al., Computer Science Department, Stanford University, http://benpfaff.org/papers/migration.pdf, Nov. 15, 2002, 14pgs.
"Virtual Appliances for Deploying and Maintaining Software," Sapuntzakis et al., Computer Systems Laboratory Stanford University, http://suif.standford.edu/papers/lisa03-deploying-vap.pdf, Sep. 3, 2003, 15pgs.
"What is Google App Engine," http://code.google.com/appengine/docs/whatisgoogleappengine.html, 5pgs.
"Amazon Elastic Compute Cloud (Amazon Ec2)," http://aws.amazon.com/ec2/, 7pgs.
"Featured Pipe: Upcoming.org Combined Feed," http://pipes.yahoo.com/pipes/, Feb. 13, 2007.
"SearchMonkey," http://developer.yahoo.com/searchmonkey/developer.html, 2008, 2pgs.

* cited by examiner

MANAGING PERSONAL DIGITAL ASSETS OVER MULTIPLE DEVICES

CROSS-RELATION TO RELATED APPLICATION

This application claims priority to provisional patent application Ser. No. 61/079,651, entitled "PERSONAL CLOUD", filed Jul. 10, 2008, by Doreen Cheng, Yu Song, Swaroop Kalasapur, Victoria Stavridou-Coleman, and Jean-Pierre Seifert, herein incorporated by reference in its entirety.

BACKGROUND OF THE INVENTION

1. Field of the Invention

The present invention relates to computing. More particularly, the present invention relates to the managing of personal digital assets over multiple devices.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

Consumers have been accumulating volumes of digital assets and using more and more Internet services. Consumers typically access these assets and services using more than one device. A typical consumer may have a desktop computer, a laptop computer, and a cell phone (and possibly other devices as well) that can all be used to access and gather information and media. The trend will continue while huge amounts of services and contents are made available on the Web daily. These assets and services are typically scattered around in personal devices as well as in various informal groupings of information known as clouds. For example, it is common for a user to have photos and messages sent by friends scattered in Kodak, Facebook, and Flickr sites. It is also often common for a user to use travel services from one site, shopping from another, and on-line social activities from other. With the volumes increasing in a rapid pace, it becomes more and more difficult for most consumers to manage these assets. It is common for a user to forget where to find a particular piece of content or a particular service is located.

Meanwhile, virtualization and Internet Cloud Computing have showed promising advantages related to reliability, scalability, and low cost resource utilization and management. It will be highly desirable for consumers not to clutter their homes with (Information Technology) IT gadgets and devices and to perform IT management themselves.

SUMMARY OF THE INVENTION

In a first embodiment of the present invention, a method for managing digital assets of a user over multiple home network-enabled devices is provided, the method comprising: receiving information, from a plurality of home network-enabled personal devices, regarding digital assets accessed by the personal devices, wherein the plurality of personal devices are owned or operated by the user and the information is automatically gathered by each personal device tracking its own usage; storing the information; and providing, to one of the plurality of personal devices, identifications of digital assets accessed by the personal devices by accessing the stored information.

In a second embodiment of the present invention, a method for managing digital assets of a user over multiple devices is provided, the method comprising: receiving information, from a plurality of personal devices, regarding digital assets accessed by the personal devices, wherein the plurality of personal devices are owned or operated by the user and the information is automatically gathered by each personal device tracking its own usage; storing the information; mining the information for identifiable interests of the user, wherein the interests are tagged based upon situations in which digital assets are accessed during the usage of the personal devices; receiving a request from a first personal device for identifications of digital assets available for access by the first personal device; receiving a current situation from the first personal device; retrieving identifications of digital assets by accessing the information and filtering the information based upon interests whose tagged situations match the current situation; and providing, to the first personal device, the identifications of digital assets.

In a third embodiment of the present invention, a method for accessing digital assets in a first personal device is provided, the method comprising: gathering usage information by tracking usage of the first personal device, wherein the usage information includes information about digital assets accessed by the first personal device and a corresponding situation in which the digital assets were accessed; sending the usage information to a personal cloud manager for aggregation with usage information from other personal devices owned or operated by the same user as the first personal device; obtaining identifications, from the personal cloud manager, of digital assets available to be accessed by the first personal device, wherein at least some of the digital assets in the identifications are located on devices other than the first personal device; and accessing, using the identifications, a digital asset located on a device other than the first personal device.

In a fourth embodiment of the present invention, a personal electronic device is provided comprising: memory; one or more sensors configured to sense situational characteristics related to the personal device or its user; and a processor configured to gather usage information by tracking usage of the first personal device, wherein the usage information includes information about digital assets accessed by the first personal device and is tagged with the corresponding situation in which the digital assets were accessed by obtaining the situational characteristics from the one or more sensors, to send the usage information to a personal cloud manager, to obtain identifications, from the personal cloud manager, of digital assets available to be accessed by the personal device, wherein at least some of the digital assets in the identifications are located on devices other than the personal device, and to access, using the identifications, a digital asset located on a device other than the personal device.

In a fifth embodiment of the present invention, an apparatus is provided comprising: means for receiving information, from a plurality of personal devices, regarding digital assets accessed by the personal devices, wherein the plurality of personal devices are owned or operated by the user and the information is automatically gathered by each personal device tracking its own usage; means for storing the information; and means for providing, to one of the plurality of personal devices, identifications of digital assets accessed by the personal devices by accessing the stored information.

In a sixth embodiment of the present invention, a program storage device readable by a machine, tangibly embodying a program of instructions executable by the machine to perform a method for managing digital assets of a user over multiple personal devices is provided, the method comprising: receiving information, from a plurality of personal devices, regarding digital assets accessed by the personal devices, wherein the plurality of personal devices are owned or operated by the user and the information is automatically gathered by each personal device tracking its own usage; storing the information; and providing, to one of the plurality of personal devices, identifications of digital assets accessed by the personal devices by accessing the stored information.

In a seventh embodiment of the present invention, a program storage device readable by a machine, tangibly embodying a program of instructions executable by the machine to perform a method for accessing digital assets in a first personal device is provided, the method comprising: gathering usage information by tracking usage of the first personal device, wherein the usage information includes information about digital assets accessed by the first personal device and a corresponding situation in which the digital assets were accessed; sending the usage information to a personal cloud manager for aggregation with usage information from other personal devices owned or operated by the same user as the first personal device; obtaining identifications, from the personal cloud manager, of digital assets available to be accessed by the first personal device, wherein at least some of the digital assets in the identifications are located on devices other than the first personal device; and accessing, using the identifications, a digital asset located on a device other than the first personal device.

DETAILED DESCRIPTION OF SPECIFIC EMBODIMENTS

Figure 1:
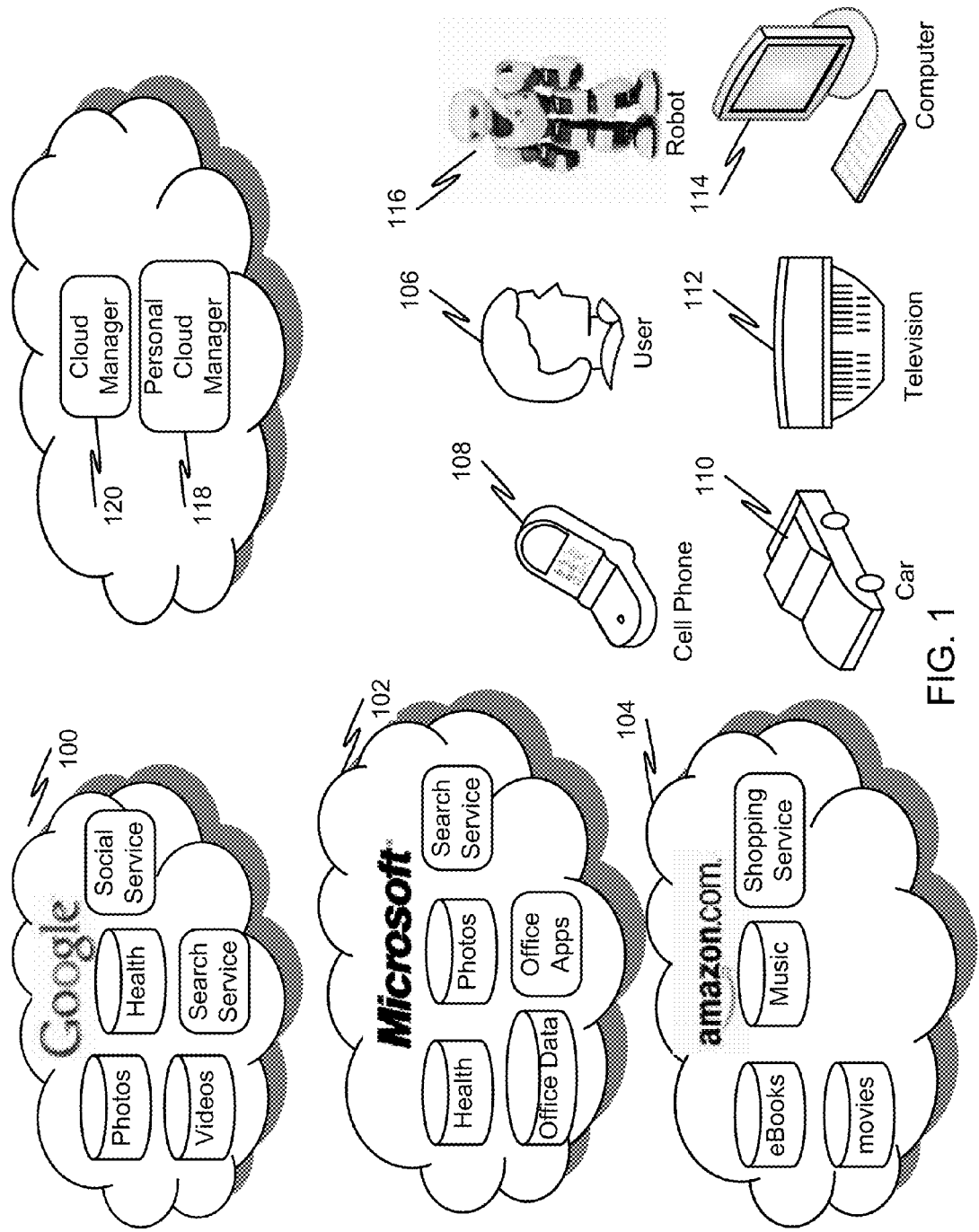
FIG. 1 depicts an example of a personal cloud system in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

A digital asset, also referred to as an asset or content, is a piece of content created or acquired using an application/service on a hardware device. Examples of hardware devices includes personal computers, mobile phones, cameras, personal data assistants, televisions, media servers, etc. Examples of digital assets include documents, web pages, photos, videos, audio, text messages, etc.

A cloud is a formal or informal grouping of information based on control. Web sites and assets under the control of a particular vendor can be called a part of the vendor's cloud. In an embodiment of the present invention, a personal cloud is provided that allows the user to control digital assets that may or may not be present on hardware devices under the control of the user. The personal cloud also allows the user to access digital assets stored on one hardware device under his control from another hardware device under his control. For example, the user may utilize a mobile phone to access digital assets on the user's personal computer. The mobile phone can also be used to access digital assets stored in vendor clouds, such as photos stored by Facebook.

FIG. 1 depicts an example of a personal cloud system in accordance with an embodiment of the present invention. In this example, a user has personal digital assets and favorite services scattered through various clouds, including a Google cloud 100, a Microsoft cloud 102, and an Amazon cloud 104. The user 106 uses his personal devices, including a cell phone 108, car 110, television 112, personal computer 114, and robotic assistant 116. The personal devices are connected through a home network. For example, each of the personal devices may be compatible with UPnP and may communicate with each other via a WiFi-based local area network. The personal cloud system contains three types of software components: the personal cloud client, the personal cloud manager 118, and the cloud manager 120.

The personal cloud client runs on each personal device that is included in the cloud. For example, each of the cell phone 108, car 110, television 112, personal computer 114, and robotic assistant 116 may run their own instance of the personal cloud client.

The personal cloud manager component 118 has a great deal of flexibility as to where it is placed. The personal cloud manager acts to aggregate information from each of the personal cloud clients corresponding to a particular user. It may be located on a centralized device within the home network. For example, it may be located on a media server. Alternatively, it could be located on one or more of the personal devices. In some embodiments, it is distributed such that it runs on a plurality of, or even all of, the personal devices within the personal cloud. In another alternative, it can be located on a device that is outside of the cloud. A cloud manager Working together, the personal cloud client(s) and the personal cloud manager 118 enable situation-aware and interest-aware management of personal assets, services, and social networking across different clouds and personal devices. The cloud manager 120 manages all the personal clouds created by subscribers.

In one embodiment of the present invention, a user proactively creates and sets up a personal cloud using an application on one of his devices. The user can specify the devices that he will use to interact with the cloud, at creation time, or can add devices to join the cloud after creation. The user can also add assets and services to be included in the cloud at creation time and/or at a later time. However, it is not required that a user manually add assets or services into the cloud. The user can choose to let the cloud atomically add the assets/services after they are accessed by the user.

Figure 2:
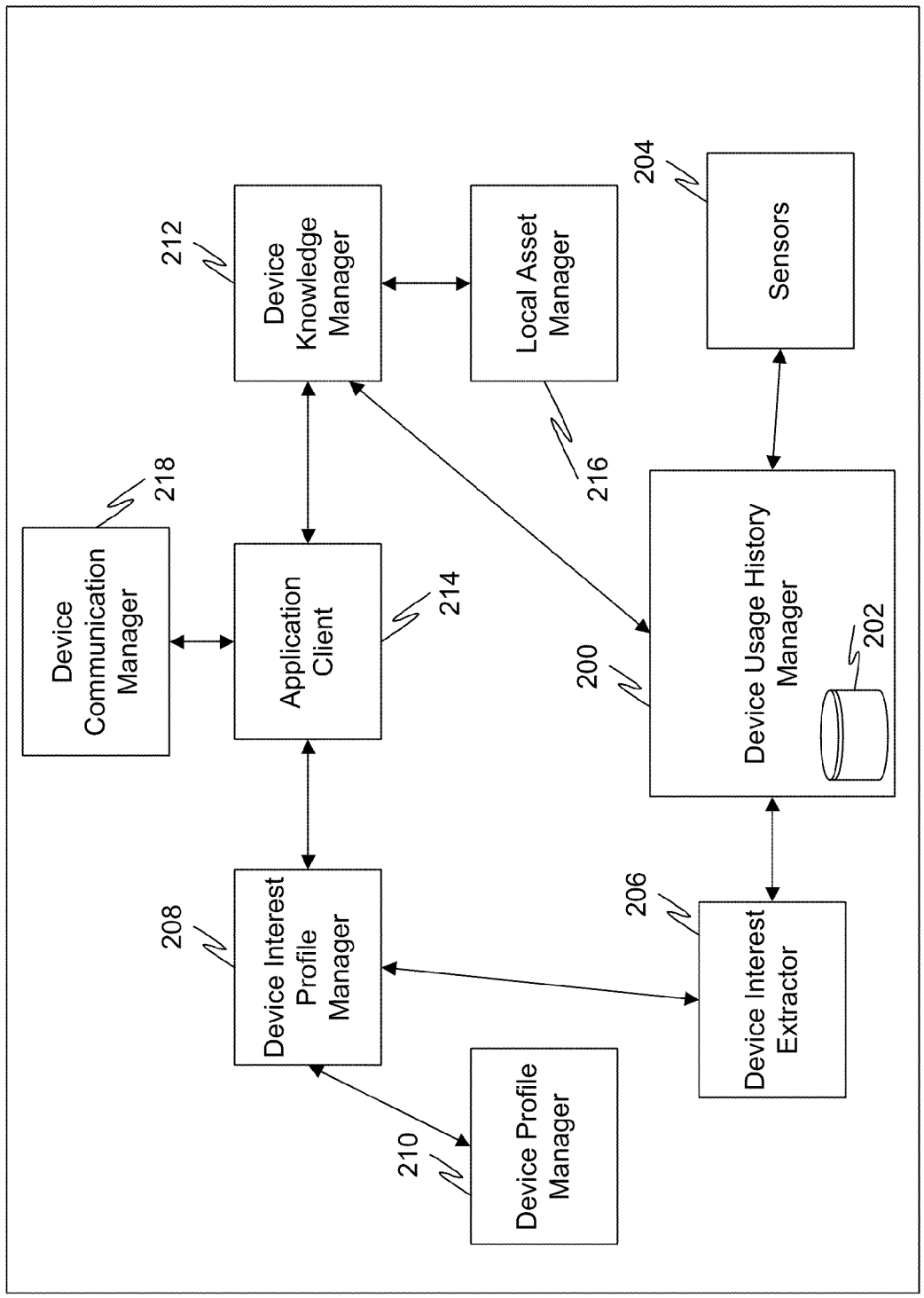
FIG. 2 is a diagram illustrating the architecture of a personal cloud client in accordance with an embodiment of the present invention.

FIG. 2 is a diagram illustrating the architecture of a personal cloud client in accordance with an embodiment of the present invention. A device usage history manager 200 tracks the events of user interactions with applications/services and then stores them as history. The device usage history manager may have access to a database or store 202 in which this information is stored. One example of the interaction events is when the user accesses an asset using a service provided by a source web site, such as Facebook or Amazon. In this case, the information recorded includes the name, type, uniform resource locator (URL), size, and other characteristic of the asset/service. For an image asset, the characteristics may include resolution, color-depth, etc. For video, speech, or music, the characteristics may also include quality of service requirements. For services used through the device, the device usage history manager 200 may capture details such as service location, access format (e.g., URL, phone number, VPN, etc.), performed operations (e.g., file upload/download, chat messages sent, received), and any such available metadata about the service.

In many circumstances, capturing all the events of user interactions can result in a significant amount of information that is tracked and recorded. In order to aid in filtering down this information to a manageable amount, situation-aware components may be utilized. A number of sensors 204 on the personal device may act to gather values of variables that can be used to define situations. Each sensor provides an interface for accessing the sensor output data. Sensors can sense environmental variables, device system variables, application states, and even user conditions. Examples of environmental sensors include location sensors, temperature sensors, weather sensors, speed sensors, direction sensors, light sensors, sound sensors, etc. Examples of user condition sensors include those sensing heartbeat, blood pressure, facial expression, gesture, emotion, and so on. Examples of application states include the name, type events, and content being manipulated. The selection of which sensors are present/used depends on the purposes of the personal device. For this reason, each personal device can have a different set of sensors (e.g., a mobile device may track speed and direction but a stationary television may not).

Data from the sensors 204 may be sent to the device usage history manager 200, which can include the sensor values sampled at the time of an event occurrence along with details of the device itself (e.g., a unique device ID) along with the user interaction information. This effectively "tags" the user interaction information with information about the situation in which the user interaction occurred.

A device interest extractor 206 fetches tracking records from the device usage history manager 200 (or the store 202) and extracts user interest patterns from the records, typically by using a learning algorithm. The device interest extractor 206 provides an interface for requesting interest pastern extraction and an interface for querying the results of the extraction. When the sensor values are included in the learning, the results are situation-aware interest patterns. Thus, this component effectively performs "interest mining" on the raw usage history information.

A device interest profile manager 208 manages user interest profiles for the personal device. It makes requests to the device interest extractor 206 to extract interest patterns from a specified history segment or the entire history to form a learned interest profile. It also provides interfaces for querying and accessing items in a profile or an entire profile. This component may also query and fetch interest profile(s) from the cloud interest profile manager, which will be described later. A user may have a manually specified interest profile, and interest profile learned from user history of a local device usage, and/or a profile fetched from the cloud interest profile manager. The device interest profile manager 208 may also chose to proactively export the profile(s) to the cloud interest profile manager. In order to process user privacy, information related to the situation can be made anonymous before sending the data out.

A device profile manager 210 maintains a profile of resource characteristics of a device. Examples of the characteristics include screen size, resolution, refresh rate, memory size, CPU and network interface state, battery state, and so on. The profile can be manually specified, dynamically constructed using sensors, or a combination of both. The component also provides an interface for querying, accessing, and manipulating the profile items. The profile may also contain the information about the local services that can be access by other devices through a network. Examples of service information include the name, address (e.g., URL, Network Address, File system path, etc.) and description of the service. The content of a description can include the interfaces, requirements, and semantic descriptions. The device profile manager 210 can also inform the cloud device profile manager (described later) about whether the personal device is online or not.

A device knowledge manager 212 fetches usage logs from the device usage history manager 200. From this history, it can extract information about the assets accessed or created by the user and how to retrieve the assets. It may also proactively export the information to the cloud knowledge manager (described later) and/or provide an interface for fetching the information. The device knowledge manager 212 may also act to "enrich" the asset information with additional information. For example, if the digital asset is a movie, the device knowledge manager 212 may access an Internet site to retrieve reviews of the movie. It may also retrieve information as to under what situations other users chose to view the movie. This information may aid in determining which assets to recommend to the user given a current situation for the user. For example, if it is a weekday evening, the system may determine that the user likes to watch comedy movies in order to "cheer up" from a long day at work. It may determine this by tracking the user's usage over time. With the user's digital assets, it may then use the review information to determine that a particular movie is indeed a comedy and present the comedy movie on a first pass list of digital assets presented to the user. Likewise, the system may determine that many male viewers prefer to watch action movies in the middle of the night, and thus may then present action movies on a first pass list of digital assets presented to a male user in the middle of the night.

An application client 214 can perform intended core application functions, but may also request interest item(s) or profile(s) from the device interest profile manager 208 and use them for enhancing user experiences. Through the device communication manager (described later), the application client 214 can query, search, and access assets and services that are stored locally, assets and services on other personal devices, and assets stored in other clouds on the Internet. An application client 214 can choose to store all the persistent data in the personal cloud and maintain a local copy. The application client 214 may have the capability to interact with the cloud server to create, modify, and terminate a personal cloud. Depending on design choices, the creating application can choose to select the personal devices to be included in the cloud. Alternatively, it can let a non-creator personal device dynamically join and leave the cloud after the creation. An application client also supports authentication and encryption for the cloud membership manager to verify its identify and grant access to the cloud.

A local asset manager 216 maintains and manages a user's local assets that can be accessed by personal devices through the device communication manager (described later). The local asset manager 216 provides an interface for such accesses. It can choose to use a push interface in the device knowledge manager 212 to pass the characteristic information of the assets and service and how to access them to the device knowledge manager 212.

A device communication manager 218 manages the cloud-specific communication traffic between a personal device and other devices as well as the traffic between a personal device and clouds in the Internet (including a personal cloud to which the device belongs). The device communication manager 218 can be equipped to handle multiple communication channels that are available in the device, such as WiFi, Bluetooth, GPRS, etc. and can communicate using multiple protocols. The device communication manager provides a transparent interface to the other component aforementioned to perform communication specific cloud operations.

Figure 3:
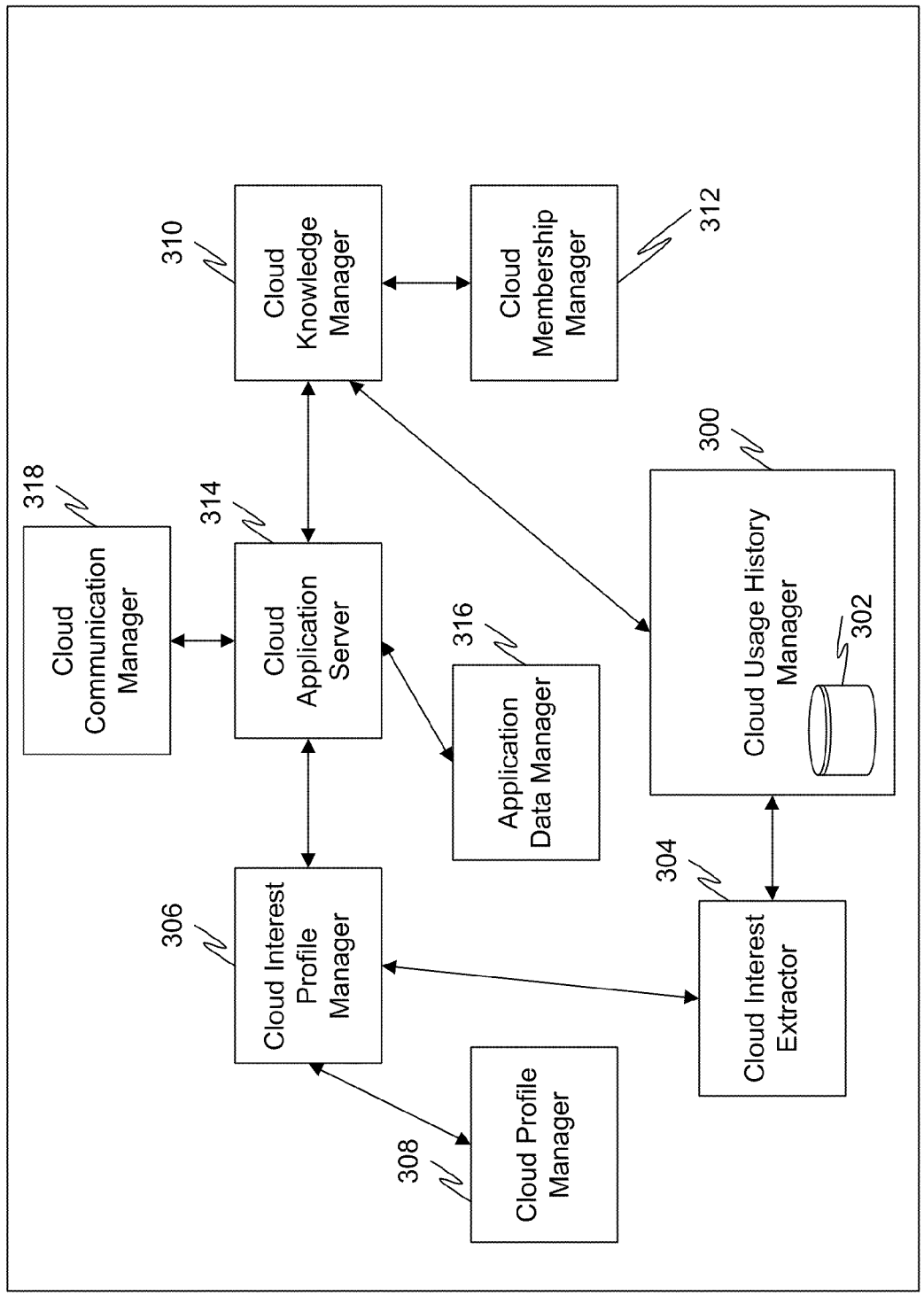
FIG. 3 is a diagram illustrating a personal cloud manager in accordance with an embodiment of the present invention.

FIG. 3 is a diagram illustrating a personal cloud manager in accordance with an embodiment of the present invention. As described above, the personal cloud manager aggregates information from a number of personal cloud clients located on personal devices of the user. It then can serve personal cloud features to the user.

A cloud usage history manager 300 maintains and manages the user's usage history from all the personal devices in the personal cloud. Additionally, the history may track over a longer period of time than the histories stored in individual devices, in cases where the cloud usage history manager is able to store more information than the personal devices (e.g., where the cloud usage history manager is running on a server or personal computer, or in a distributed architecture having enough memory resources). The cloud usage history manager 300 provides an interface for accessing a segment of the history or an entire history. For example, a segment can be fetched based on a time range, based on a particular device(s) history, based on a particular service, etc. Through this interface, the cloud interest extractor (described later) can fetch needed history data. It may also provide an interface for a device history manager to push history data from a device.

The cloud usage history manager 300 may have access to a database or store 302 in which this history information is stored.

A cloud interest extractor 304 fetches a segment of the history or the entire history from the cloud usage history manager 300 and extracts general and long-term user interest patterns from the history, using appropriate algorithms. The algorithms used by this component may be more sophisticated and require more system resources than those used by an individual device interest extractor. The cloud interest extractor 304 may also provide an interface for requesting interest pattern extraction and for querying the results of the learning.

A cloud interest profile manager 306 manages the interest profiles for the user. In the simplest case, it can fetch and maintain the interest profiles from all the participating personal devices. The component can also derive the user's general and long-term interests by requesting that the cloud interest extractor 304 perform interest extraction. The cloud interest profile manager 306 also provides an interface for querying, accessing, and updating the profiles.

A cloud profile manager 308 maintains the profiles of resource characteristics of all the personal devices that belong to the personal cloud. If a device profile also contains information about the services that can be accessed by the other devices through a network, the information about the services is also recorded. The cloud profile manager 308 provides an interface for querying, fetching, and/or modifying the profiles. This component also stores the knowledge regarding whether a device is online (or "currently available").

A cloud knowledge manager 310 fetches or receives the information on the assets and how to retrieve them, from one or more device knowledge managers of participating personal devices. It manages this information and provides an interface for querying, accessing, and modifying the information. The cloud knowledge manager 310 also can provide authorization capabilities for the personal assets by, for example associating an access control list with each asset. This enables the user to control who can share an asset and how.

A cloud membership manager 312 gets the information about the user and the device at the time the cloud is activated. It provides an interface for updating this information. It also uses the information to authenticate the user and the usages of the functions provided by the personal cloud. Additionally, this component can provide authentication capabilities so that the user can share an asset with a friend and invite him or her to access the asset. This component also maintains the relevant information about other personal clouds where the user has been given privileges (such as assets of an owner of another cloud).

A cloud application server 314 can be one of several in a personal cloud. The cloud application server 314 can use the information managed by the cloud knowledge manager 310 to fetch assets and/or services requested by the user. It may use the information in the user's interest profile to provide better experiences to the user. It may also access the characteristics of a particular personal device and use them to select assets and/or services that are better suited for the device and/or situation. As an example, a cloud application server 314 can cache appropriated assets for a user based on his/her current interests and the capabilities of the device being used. Existing technologies such as those described in SOAP/OWL/CC/PP can be used to enable the matching. In order to support social networking applications running on personal devices, the cloud application server 314 can work with the cloud membership manager 312 and the cloud knowledge manager 310 to support authentication and authorization needed for the people in the user's social networks to access shared assets. Depending on application requirements and design choices, a server may serve one particular application client or a group of application clients. In cases where a server serves a group of application clients that are running on more than one device, the server ensures the correctness and consistency of the data involved across all entities. For example, the calendar data in all devices with a calendar application client should be correct and consistent with the data managed by an application data server. Thus, one of the roles of the cloud application server 314 is to ensure a transparent experience of the entire cloud to the user.

An application data manager 316 manages data generated and used by selected applications, e.g., contact lists, calendar entries, bookmarks, emails, messages, and so on. It provides interfaces for manipulating the data, such as add, delete, query, access, and modify.

A cloud communication manager 318 manages the communication traffic between the personal cloud and the Internet and the traffic between the personal cloud client(s) and the personal cloud manager. A web server may be used to fulfill this role.

The cloud manager is a distinct component than the personal cloud manager described in FIG. 3, although it may be operated on the same physical device(s) as the personal cloud manager and/or distributed in the same way, as can be seen in FIG. 1. The cloud manager maintains and manages the information about all the clouds created by the user community and manages how the clouds utilize the system resources, such as CPUs, memories, persistent storages, and network resources such as buffers and bandwidth. The information should at least be sufficient to support cloud creation and activation, e.g., cloud name, user's identity for authentication purposes, identity of each personal device authorized to participate in the cloud, etc. It provides interfaces for creating, configuring, modifying, and terminating a personal cloud. Additionally, existing cloud management technologies can also be used here.

A personal cloud can be created by a user using an application client on a personal device. After the cloud is created, the cloud manager sets up all the information about the cloud and activates it. After the activation, when the user changes the membership information, the update will be pushed to the cloud membership manager. The cloud manager maintains a directory of all clouds created and provides interfaces for querying, accessing, and modifying the content of the directory. The directory information can be used, for example, to allow a user in one personal cloud to access assets in another personal cloud. This situation arises when a user has more than one cloud (e.g., one for home and one for work). This situation can also occur when a user tries to access shared assets with another user. The cloud manager also provides authentication services for the personal cloud clients. When performing a cross-cloud operation (such as user A attempting to access resources of user B), the authenticity of the personal cloud client itself may be ensured by the cloud manager. If a single user has created more than one personal cloud, the cloud manager manages these clouds and allows the user to access the assets across all of his or her personal clouds.

Figure 4:
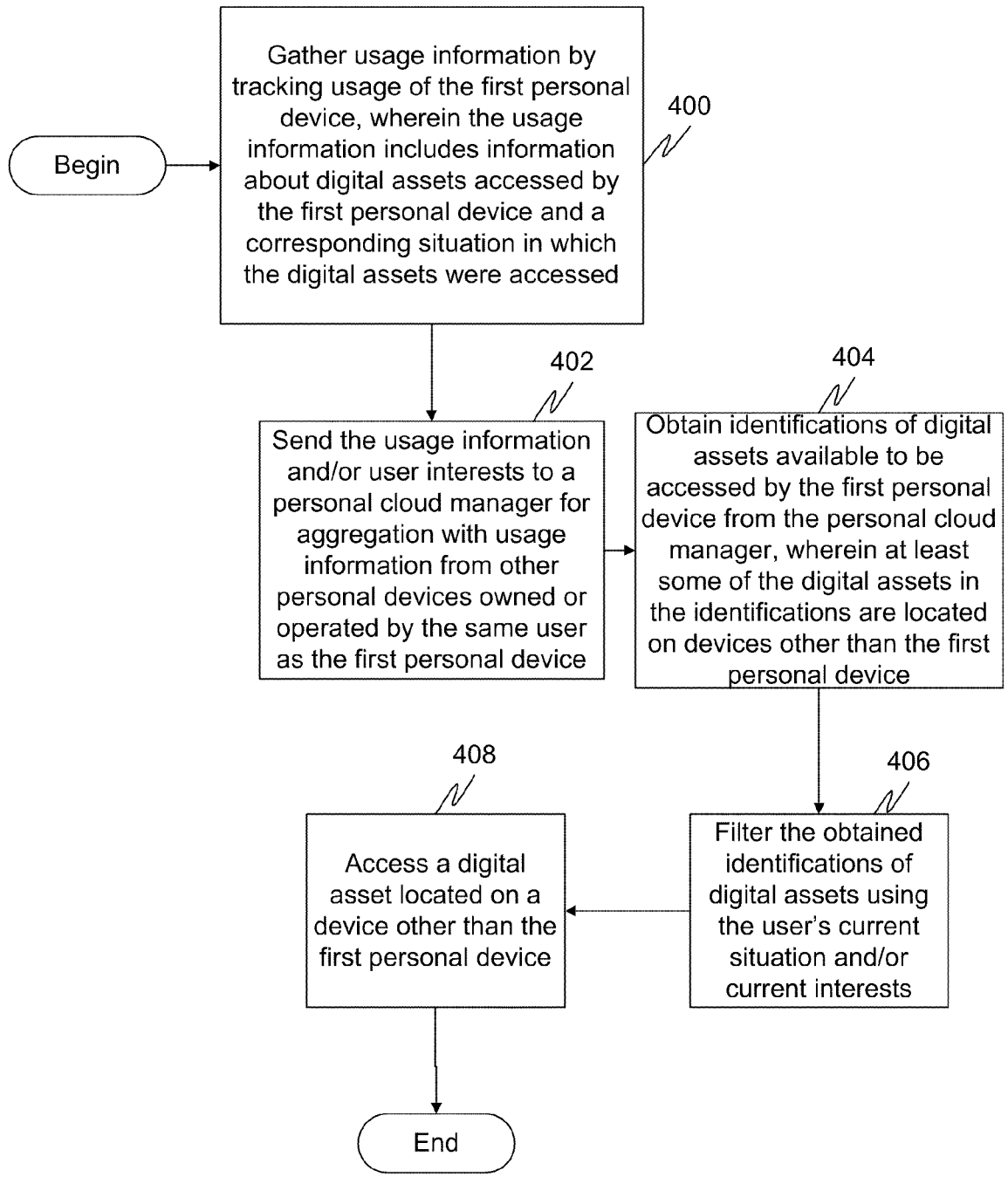
FIG. 4 is a flow diagram illustrating a method for managing digital assets of a user over multiple home network devices in accordance with another embodiment of the present invention.

FIG. 4 is a flow diagram illustrating a method for managing digital assets of a user over multiple home network devices in accordance with another embodiment of the present invention. This method is directed to steps performed by the "client-side" of the personal cloud components. Specifically, this method may be performed by a personal cloud client operating on a first personal device of a user (or any other personal device of the user, however the term "first" is used to differentiate the personal device at hand from other personal devices of the user).

At 400, usage information is gathered by tracking usage of the first personal device, wherein the usage information includes information about digital assets accessed by the first personal device and a corresponding situation in which the digital assets were accessed. At 402, the usage information and/or user interests are sent to a personal cloud manager for aggregation with usage information from other personal devices owned or operated by the same user as the first personal device, where the usage information may include corresponding situation information that indicates the situation under which a usage occurred. This situation information may be obtained from one or more sensors located on the first personal device. The situation portion of the usage information is used by the personal cloud manager to filter digital assets to present in identifications of digital assets to be presented. At 404, identifications of digital assets available to be accessed by the first personal device are obtained from the personal cloud manager, wherein at least some of the digital assets in the identifications are located on devices other than the first personal device. At 406, the obtained identifications of digital assets may be filtered using the user's current situation and/or current interests. At 408, a digital asset located on a device other than the first personal device is accessed using the identifications.

Figure 5:
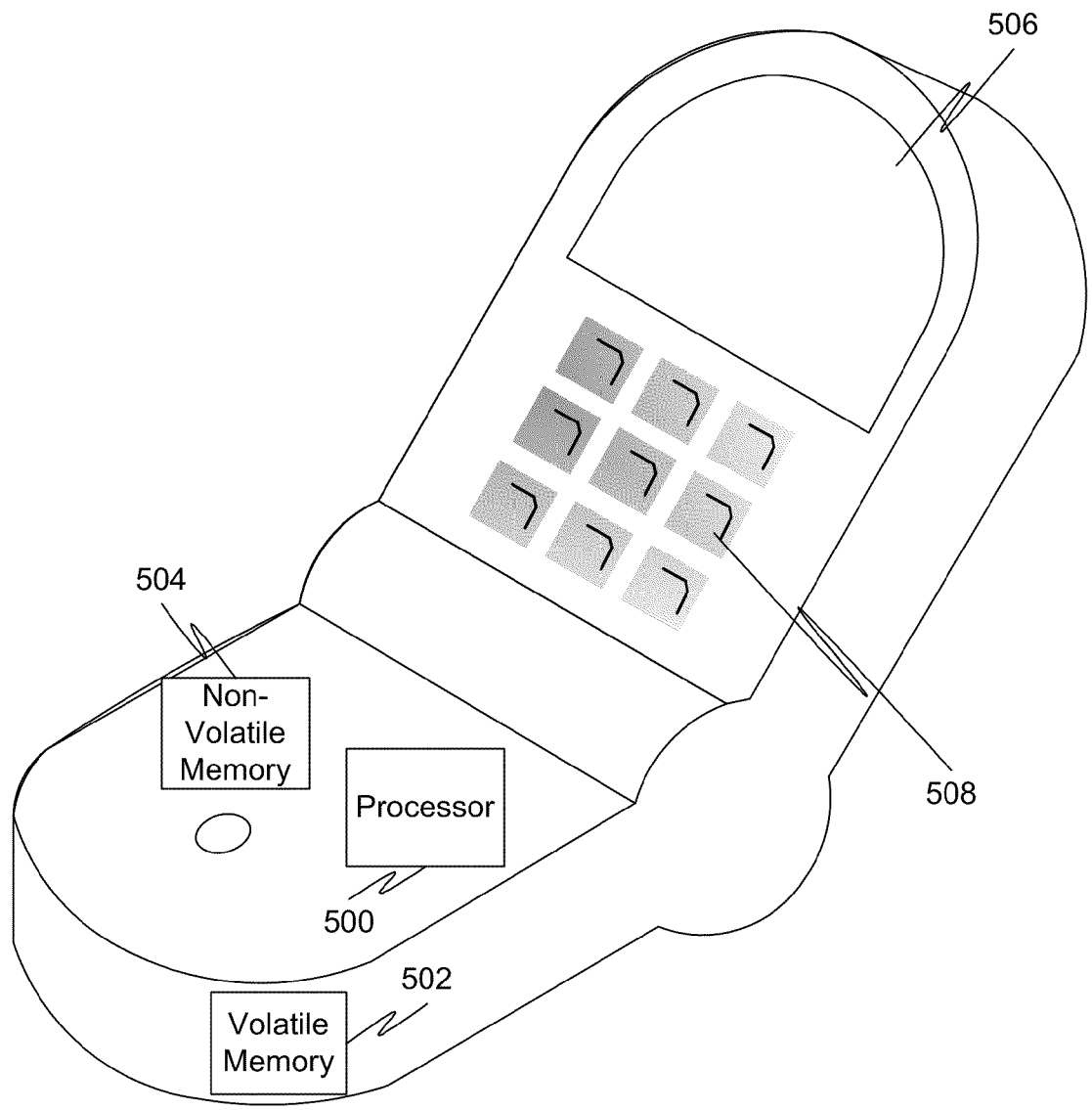
FIG. 5 is a diagram illustrating a cell phone in accordance with an embodiment of the present invention.

As described briefly above, the personal cloud clients may run on personal devices of the user. These personal devices may include any electronic component that are compatible with a home network, such as a UPnP network. FIG. 5 is a diagram illustrating a cell phone in accordance with an embodiment of the present invention. A personal cloud client may operated on the cell phone, with a processor 500 performing various steps of the method described in FIG. 4 above. Volatile memory 502, non-volatile memory 504, display 506, and various buttons and other navigational controls 508 may also be used to perform or add to various steps of the method. In some cell phone embodiments, the buttons and other navigational controls are virtual controls implemented on a touch-sensitive display rather than distinct physical buttons or controls.

Figure 6:
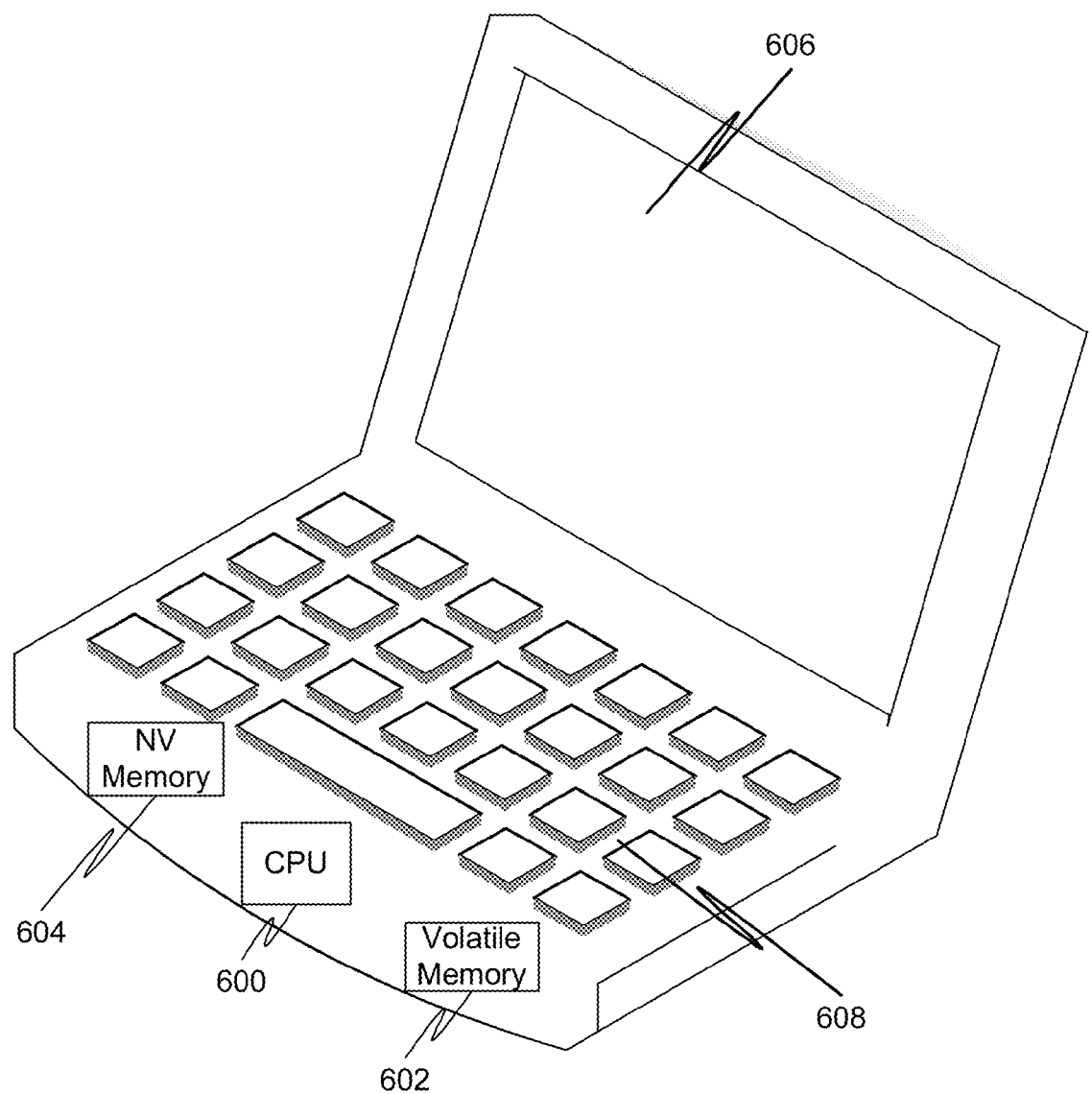
FIG. 6 is a diagram illustrating a personal computer in accordance with an embodiment of the present invention.

FIG. 6 is a diagram illustrating a personal computer in accordance with an embodiment of the present invention. A personal cloud client may be operated on the personal computer, with a processor 600 performing various steps of the method described in FIG. 4 above. Volatile memory 602, non-volatile memory 604, display 606, and keyboard 608 may also be used to perform or add to various steps of the method. The personal computer can be a desktop, laptop (or notebook), netbook, or any other types of personal computer.

Figure 7:
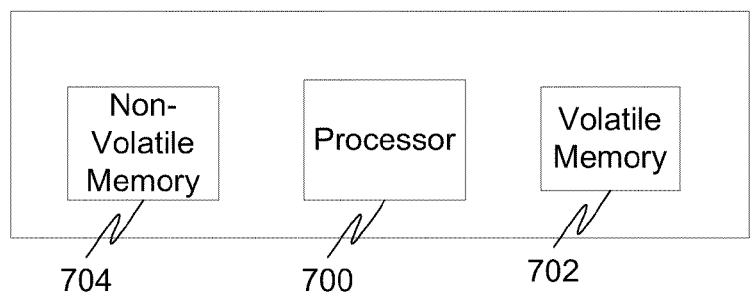
FIG. 7 is a diagram illustrating a set-top box in accordance with an embodiment of the present invention.

FIG. 7 is a diagram illustrating a set-top box in accordance with an embodiment of the present invention. A personal cloud client may be operated on the set-top box, which is typically connected to a television 700. A processor 702 performs various steps of the method described in FIG. 4 above. Volatile memory 702 and non-volatile memory 704 may also perform or add to various steps of the method, with navigational controls from a remote control may also be used in a similar manner to other navigational devices described above with respect to other embodiments.

Figure 8:
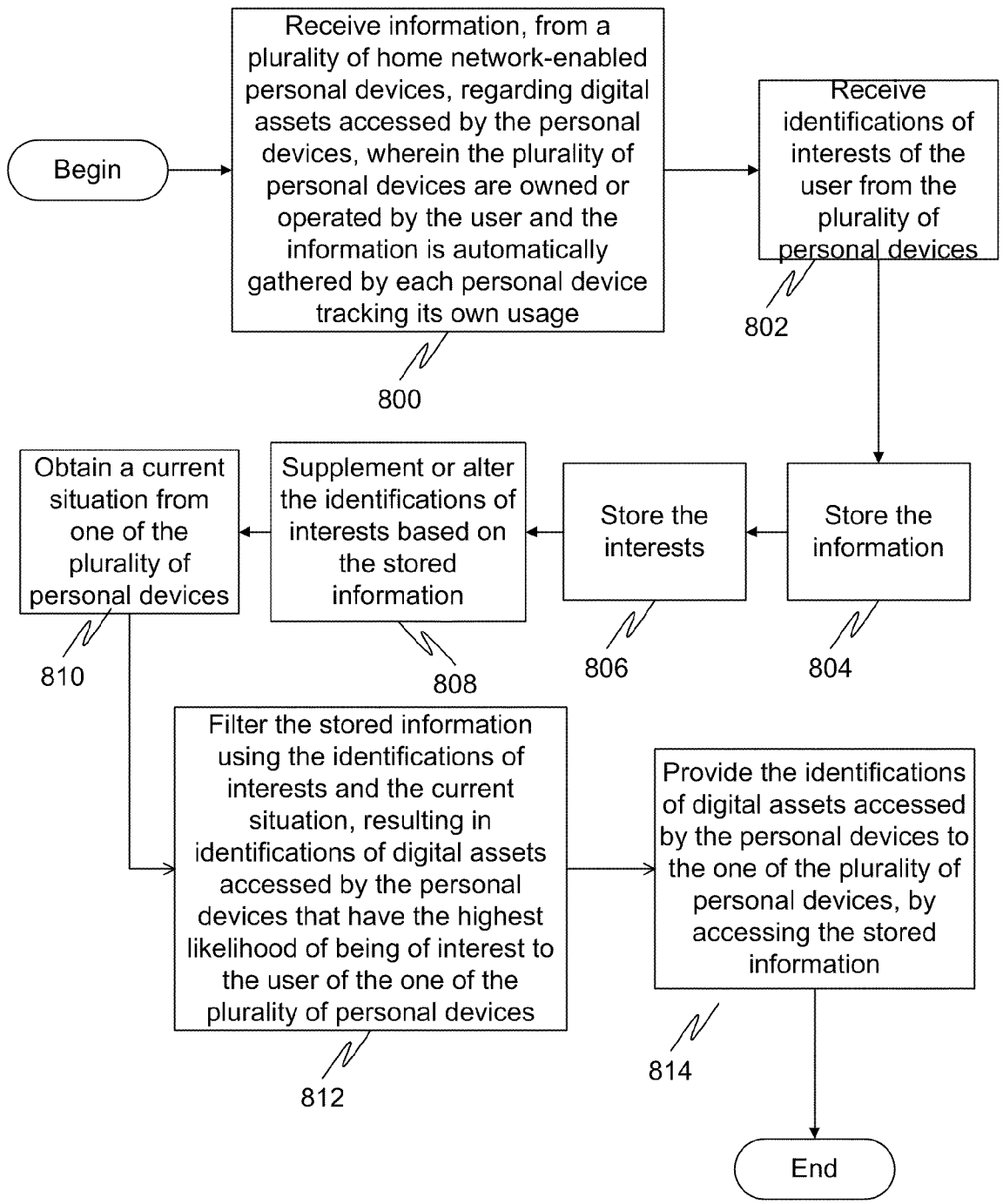
FIG. 8 is a flow diagram illustrating a method for managing digital assets of a user over multiple home network devices in accordance with an embodiment of the present invention.

FIG. 8 is a flow diagram illustrating a method for managing digital assets of a user over multiple home network devices in accordance with an embodiment of the present invention. This method is directed to steps performed by the "server-side" of the personal cloud components. Specifically, this method may be performed by a personal cloud manager. At 800, information is received, from a plurality of home network-enabled personal devices, regarding digital assets accessed by the personal devices, wherein the plurality of personal devices are owned or operated by the user and the information is automatically gathered by each personal device tracking its own usage. The home network may be a UPnP network. At 802, identifications of interests of the user may be received from the plurality of personal devices. These interests may have been manually input by the user into a profile or may have been automatically generated by each personal device applying a learning algorithm to raw usage information it has gathered. The interests may include information regarding the situations in which the digital assets corresponding to the interests were accessed. It should be noted that steps 800 and 802, like many of the steps in the methods described in this application, can be performed in a different order and that the presentation of the steps in one particular order should not be taken to imply that the claims should be limited to that particular order.

At 804, the information is stored. Where the information is stored may vary greatly depending upon implementation. In one example, the personal cloud manager has a corresponding database in which the store the information. In another example, the personal cloud manage may simply use general memory to store the information. In another example, the information may be distributed across multiple devices or components.

At 806, the identifications of interests are stored. At 808, the identifications of interests are supplemented or altered based on the stored information. This step differs from step 802 in that the generation of identifications of interests is performed using a learning algorithm at the personal cloud manager, instead of at the individual personal cloud clients. The personal cloud manager has access to aggregated information from multiple personal cloud clients, and thus may generate useful interest information that could not be generated by any one of the personal cloud clients alone.

At 810, a current situation is obtained from one of the plurality of personal devices.

At 812, the stored information is filtered using identifications of interests and the current situation, resulting in identifications of digital assets accessed by the personal devices that have the highest likelihood of being of interest to the user of the one of the plurality of personal devices. The filtering may also include selecting interests using information regarding the one of the plurality of personal devices, stored in a device profile corresponding to the one of the plurality of devices. This allows the identifications of digital assets to reflect, for example, the physical capabilities of the one of the plurality of personal devices, such as its screen size or resolution. The interests used may be the ones that were stored in step 806.

At 814, the identifications of digital assets accessed by the personal devices is provided to the one of the plurality of personal devices, by accessing the stored information.

It should be noted that even though the steps outlined above are listed as separate steps and listed in a certain order, nothing in this specification shall be taken to mean that these steps cannot be performed simultaneously and/or in a different order than listed. For example, the list of interests from a personal device may be received at the same time the information regarding the digital assets accessed by the personal devices. In another example, the filtering of the information may be performed prior to the information being stored. The claims shall be interpreted broadly to cover such implementations.

The personal cloud manager could run on any of the devices that run a personal cloud client. However, in many instances it will be preferable to use a device that has increased processing power, memory storage, or other performance factors since aggregation of the personal usage information from multiple personal devices can utilize more system resources than the functions performed by the personal cloud clients alone.

Figure 9:
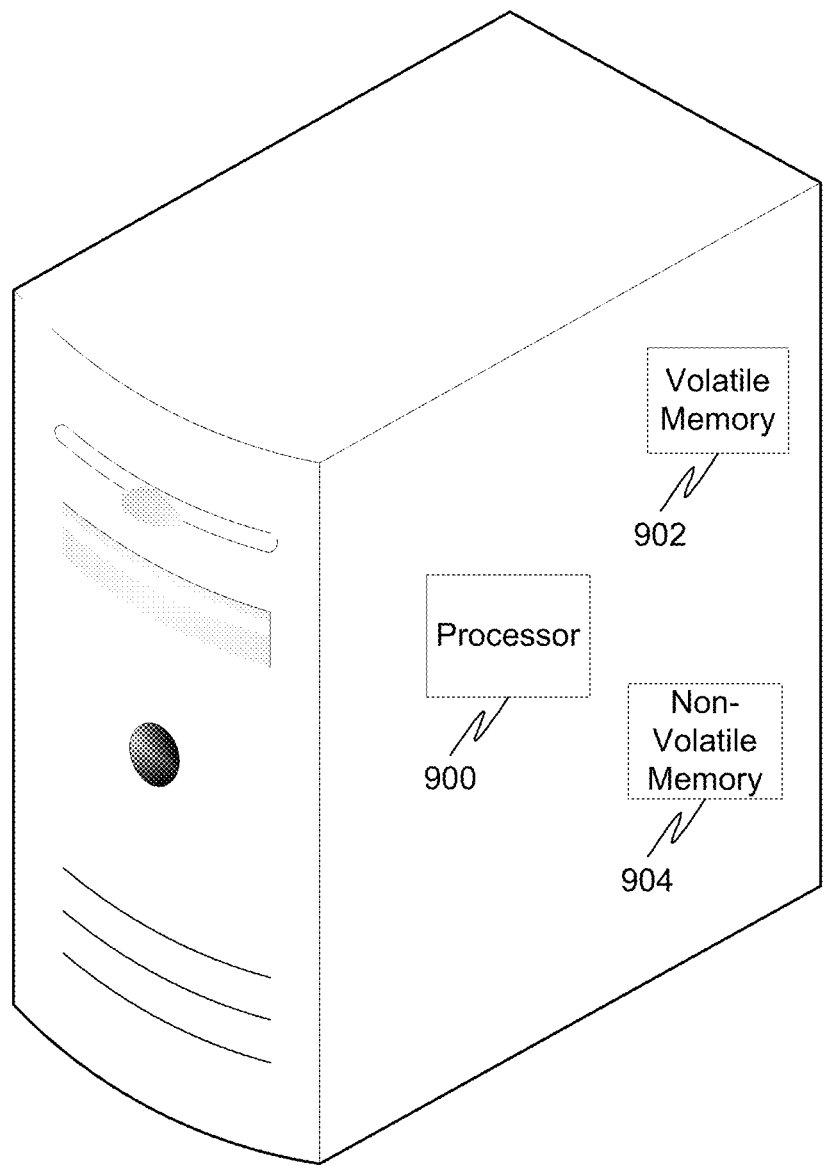
FIG. 9 is a diagram illustrating a server in accordance with an embodiment of the present invention.

FIG. 9 is a diagram illustrating a server in accordance with an embodiment of the present invention. The personal cloud manager may be operated on the server, with a processor 900 performing various steps of the method described in FIG. 8 above. Volatile memory 902 and non-volatile memory 904 may also be used to perform or add to various steps of the method.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for managing digital assets in a personal cloud of a user over multiple home network-enabled devices, the method comprising:

receiving information, from a plurality of home network-enabled personal devices, regarding usage of digital assets accessed by the personal devices including accessing of digital assets provided by one or more source web sites, wherein the plurality of personal devices are owned or operated by the user and the information is automatically gathered by each personal device tracking its own usage;

storing the information; and providing, to one of the plurality of personal devices, identifications of digital assets accessed by the personal devices as well as assets located in multiple vendor clouds from multiple retailers not controlled by the user, wherein each vendor cloud includes one or more web sites and associated digital assets controlled by a particular vendor and the user has personal digital assets scattered throughout the multiple vendor clouds and wherein providing includes filtering the identifications of digital assets based on identifications of interests in or derived from the information regarding usage, by accessing the stored information.

2. The method of claim 1, wherein the identifications of interests were manually input by the user into a profile.

3. The method of claim 2, wherein the identifications of interests were automatically generated by each personal device applying a learning algorithm to raw usage information it has gathered.

4. The method of claim 1, further comprising:
generating identifications of interests of the user based upon the stored information; and
filtering the stored information using the identifications of interests, resulting in the identifications of digital assets representing the digital assets accessed by the personal devices that have the highest likelihood of being of interest to the user.

5. The method of claim 1, wherein the identifications of interests include information regarding the situations in which digital assets corresponding to the interests were accessed, and wherein the method further comprises obtaining a current situation from the one of the plurality of personal devices, wherein the filtering includes selecting digital assets using the current situation and information regarding the situations in which digital assets corresponding to the interests were accessed.

6. The method of claim 5, wherein the filtering further comprises selecting interests using information regarding the one of the plurality of personal devices, stored in a device profile corresponding to the one of the plurality of personal devices.

7. The method of claim 3, wherein the identifications of interests include information regarding the situations in which digital assets corresponding to the interests were accessed, and wherein the method further comprises obtaining a current situation from the one of the plurality of personal devices, wherein the filtering includes selecting digital assets using the current situation and information regarding the situations in which digital assets corresponding to the interests were accessed.

8. The method of claim 7, wherein the filtering further comprises selecting interests using information regarding the one of the plurality of personal devices, stored in a device profile corresponding to the one of the plurality of personal devices.

9. The method of claim 1, wherein at least one of the digital assets is stored on a device outside of the plurality of personal devices.

10. The method of claim 1, wherein the home network-enabled personal devices are Universal Plug-and-Play (UPnP) enabled.

11. A method for managing digital assets of a user over multiple devices, the method comprising:
receiving information, from a plurality of personal devices, regarding digital assets accessed by the personal devices including digital assets accessed via one or more source web sites, wherein the plurality of personal devices are owned or operated by the user and the information is automatically gathered by each personal device tracking its own usage;
storing the information;
mining the information for identifiable interests of the user, wherein the interests are tagged based upon situations in which digital assets are accessed during the usage of the personal devices;
receiving a request from a first personal device for identifications of digital assets available for access by the first personal device;
receiving a current situation from the first personal device;
retrieving identifications of digital assets from the personal devices as well as assets located in multiple vendor clouds from multiple retailers not controlled by the user by accessing the information and filtering the information based upon interests whose tagged situations match the current situation wherein each vendor cloud includes one or more web sites and associated assets controlled by a particular vendor and the user has personal digital assets scattered throughout the multiple vendor clouds; and
providing, to the first personal device, the identifications of digital assets.

12. The method of claim 11, wherein at least one of the digital assets is stored on a device other than the one of the plurality of personal devices to which identifications of digital assets is provided.

13. The method of claim 11, further comprising:
obtaining a profile regarding the capabilities of the one of the plurality of personal devices; and
filtering the information based upon digital assets that match the capabilities of the one of the plurality of personal devices.

14. A method for accessing digital assets in a first personal device, the method comprising:
gathering usage information by tracking usage of the first personal device, wherein the usage information includes information about digital assets accessed by the first personal device and a corresponding situation in which the digital assets were accessed, including digital assets accessed via one or more source web sites associated with multiple vendor clouds from multiple retailers not controlled by the user wherein each vendor cloud includes one or more web sites and associated assets controlled by a particular vendor and the user has personal digital assets scattered throughout the multiple vendor clouds;
sending the usage information to a personal cloud manager for aggregation with usage information from other personal devices owned or operated by the same user as the first personal device;
obtaining identifications, from the personal cloud manager, of digital assets available to be accessed by the first personal device, wherein at least some of the digital assets in the identifications are located on devices other than the first personal device and are on devices outside of the control of the user, yet inside a personal cloud for the user; and
accessing, using the identifications, a digital asset located on a device other than the first personal device.

15. The method of claim 14, wherein the situation portion of the usage information is used by the personal cloud manager to filter digital assets to present in the identifications.

16. The method of claim 14, wherein the situation information is obtained from one or more sensors located on the first personal device.

17. A system for managing digital assets of a user over multiple devices, the system comprising:
a processor; and
a plurality of personal cloud clients, each of the personal cloud clients located on a personal device owned or operated by the user and comprising:
one or more sensors configured to sense situational characteristics related to the corresponding personal device or its user;
a device usage history manager configured to gather usage information by tracking usage of the first personal device, wherein the usage information includes information about digital assets accessed by the first personal device, including digital assets accessed via one or more source web sites associated, and is tagged with the corresponding situation in which the digital assets were accessed by obtaining the situational characteristics from the one or more sensors;

a device communication manager configured to send the usage information to a personal cloud manager; and an application client configured to obtain identifications, from the personal cloud manager, of digital assets available to be accessed by the personal device, wherein at least some of the digital assets in the identifications are located on devices other than the personal device, and to access, using the identifications, a digital asset located on a device other than the personal device;

the personal cloud manager communicatively coupled to the plurality of personal cloud clients as well as assets located in multiple vendor clouds from multiple retailers not controlled by the user wherein each vendor cloud includes one or more web sites and associated assets controlled by a particular vendor and the user has personal digital assets scattered throughout the multiple vendor clouds, the personal cloud manager comprising:

a cloud usage history manager configured to receive the usage information, from the plurality of personal cloud clients, regarding digital assets accessed by the personal devices and configured to store the usage information; and an application configured to provide, to the personal cloud clients, identifications of digital assets accessed by the personal devices by accessing the stored usage information.

18. The system of claim 17, wherein the personal cloud manager further comprises:

a cloud interest extractor configured to generate identifications of interests of the user based upon the stored usage information.

19. The system of claim 18, further comprising:

a cloud interest profile manager configured to store an interest profile for the user based on the generated identifications of interests.

20. The system of claim 18, further comprising:

a cloud knowledge manager configured to manage information on the digital assets and how to retrieve them, and further configured to obtain additional information regarding the digital assets from information sources outside the personal devices.

21. The system of claim 18, wherein the cloud interest extractor is further configured to utilize situation information in the stored usage information and information regarding a current situation to generate the identifications of interests for the user.

22. A personal electronic device comprising:

memory;

one or more sensors configured to sense situational characteristics related to the personal device or its user; and a processor configured to gather usage information by tracking usage of the first personal device, wherein the usage information includes information about digital assets accessed by the first personal device, including digital assets accessed via one or more source web sites associated with multiple vendor clouds from multiple retailers not controlled by the user, wherein each vendor cloud includes one or more web sites and associated digital assets controlled by a particular vendor and the user has personal digital assets scattered throughout the multiple vendor clouds, and is tagged with the corresponding situation in which the digital assets were accessed by obtaining the situational characteristics from the one or more sensors, to send the usage information to a personal cloud manager, to obtain identifications, from the personal cloud manager, of digital assets available to be accessed by the personal device, wherein at least some of the digital assets in the identifications are located on devices other than the personal device, and to access, using the identifications, a digital asset located on a device other than the personal and that is outside of the control of the user yet inside a personal cloud for the user.

23. An apparatus comprising:

means for receiving information, from a plurality of home network-enabled personal devices, regarding usage of digital assets accessed by the personal devices including via one or more source web sites, wherein the plurality of personal devices are owned or operated by the user and the information is automatically gathered by each personal device tracking its own usage;

means for storing the information; and means for providing, to one of the plurality of personal devices, identifications of digital assets accessed by the personal devices as well as assets located in multiple vendor clouds from multiple retailers not controlled by the user wherein each vendor cloud includes one or more web sites and associated assets controlled by a particular vendor and the user has personal digital assets scattered throughout the multiple vendor clouds wherein the providing includes filtering the identifications of digital assets based on identifications of interests in or derived from the information regarding usage, by accessing the stored information.

24. The apparatus of claim 23, wherein identifications of interests include information regarding the situations in which digital assets corresponding to the interests were accessed, and wherein the apparatus further comprises means for obtaining a current situation from the one of the plurality of personal devices, wherein the means for filtering includes means for selecting digital assets using the current situation and information regarding the situations in which digital assets corresponding to the interests were accessed.

25. A non-transitory program storage device readable by a machine, tangibly embodying a program of instructions executable by the machine to perform a method for managing digital assets of a user over multiple personal devices, the method comprising:

receiving information, from a plurality of home network-enabled personal devices, regarding usage of digital assets accessed by the personal devices, including digital assets accessed via one or more source web sites, wherein the plurality of personal devices are owned or operated by the user and the information is automatically gathered by each personal device tracking its own usage;

storing the information; and providing, to one of the plurality of personal devices, identifications of digital assets accessed by the personal devices as well as assets located in multiple vendor clouds from multiple retailers not controlled by the user, wherein the providing includes filtering the identifications of digital assets based on identifications of interests in or derived from the information regarding usage, by accessing the stored information.

26. A non-transitory program storage device readable by a machine, tangibly embodying a program of instructions executable by the machine to perform a method for accessing digital assets in a first personal device, the method comprising:

gathering usage information by tracking usage of the first personal device, wherein the usage information includes information about digital assets accessed by the first personal device and a corresponding situation in which the digital assets were accessed, including digital assets accessed via one or more source web sites associated with multiple vendor clouds from multiple retailers not controlled by the user, wherein each vendor cloud includes one or more web sites and associated digital assets controlled by a particular vendor and the user has personal digital assets scattered throughout the multiple vendor clouds;

sending the usage information to a personal cloud manager for aggregation with usage information from other personal devices owned or operated by the same user as the first personal device;

obtaining identifications, from the personal cloud manager, of digital assets available to be accessed by the first personal device, wherein at least some of the digital assets in the identifications are located on devices other than the first personal device and are on devices outside of the control of the user, yet inside a personal cloud for the user; and accessing, using the identifications, a digital asset located on a device other than the first personal device.

27. The method of claim 1, wherein the identifications of digital assets provided include identifications of assets of another user.

* * * * *